(12) United States Patent
Liew

(10) Patent No.: US 7,848,637 B1
(45) Date of Patent: Dec. 7, 2010

(54) HIDDEN CAMERA DISGUISED AS TISSUE BOX

(75) Inventor: Fuk-Sang Liew, 6F.-6, No. 646, Sec. 5, Chongsin Rd., Sanchong City, Taipei Country (TW)

(73) Assignees: Talitor Far East Co., Ltd., Taipei Country (TW); Fuk-Sang Liew, Taipei Country (TW)

( * ) Notice: Subject to any disclaimer, the term of this patent is extended or adjusted under 35 U.S.C. 154(b) by 27 days.

(21) Appl. No.: 12/497,594

(22) Filed: Jul. 3, 2009

(30) Foreign Application Priority Data

Jan. 23, 2009 (CN) ............................ 98 2 01377 U

(51) Int. Cl.
*G03B 29/00* (2006.01)
(52) U.S. Cl. ...................................... 396/433; 348/151
(58) Field of Classification Search ................. 396/429, 396/433; 348/151; *G03B 29/00*
See application file for complete search history.

(56) References Cited

U.S. PATENT DOCUMENTS

| 6,449,431 | B1 * | 9/2002 | Cuddeback et al. | ........... 396/27 |
| 2003/0016286 | A1 * | 1/2003 | Liu et al. | .................... 348/143 |

FOREIGN PATENT DOCUMENTS

GB 2194408 A * 3/1988

* cited by examiner

*Primary Examiner*—W. B. Perkey
*Assistant Examiner*—Noam Reisner
(74) *Attorney, Agent, or Firm*—Ming Chow; Sinorica, LLC

(57) ABSTRACT

A hidden camera disguised as a tissue box so as for the hidden camera to have the semblance of a tissue box includes: a base, a casing engaged with and fixed in position to the base, a battery chamber, a supporter positioned above the battery chamber and configured to support a tissue pack, and a camera unit including a lens unit and a printed circuit board. The lens unit includes a lens positioned immediately behind a lens aperture of the casing.

13 Claims, 6 Drawing Sheets ial. The first casing 111 and the second casing 113 are of deep# HIDDEN CAMERA DISGUISED AS TISSUE BOX

FIELD OF THE INVENTION

The present invention relates to cameras, and more particularly, to a hidden camera disguised as a tissue box.

BACKGROUND OF THE INVENTION

Owing to its appearance, a conventional surveillance camera is readily identifiable as a camera and thereby it is likely to be discovered by people; hence, it is rarely used in taking pictures secretly.

A conventional surveillance pinhole camera is compact enough to be hidden inside another article, such as a clock, a wall painting, or an ornament. To enable the pinhole camera to work, there must be a tiny hole at an appropriate position of the article to thereby allow light to reach the lens of the pinhole camera via the tiny hole. Still, there is likelihood of detecting the tiny hole of the article.

In view of the aforesaid drawbacks of the prior art, the present invention provides a hidden camera disguised as a tissue box so as for the hidden camera to have the semblance of a tissue box and thereby it can be almost undetectable.

SUMMARY OF THE INVENTION

It is an objective of the present invention to provide a hidden camera disguised as a tissue box so as for the hidden camera to have the semblance of a tissue box and be covertly installed within the inner space of the fake tissue box.

Another objective of the present invention is to provide a hidden camera disguised as a tissue box so as for the hidden camera to have the semblance of a tissue box, such that the hidden camera covertly installed within the inner space of the fake tissue box is unlikely to be detected.

To achieve the above and other objectives, the present invention provides a hidden camera disguised as a tissue box, comprising: a base; a battery chamber; a casing comprising a first casing and a second casing, the first and second casings being box-shaped and engaged with and fixed in position to the base, with the first casing enclosing and fitting the second casing, allowing a first tissue outlet to be provided on an upper surface of the first casing, a second tissue outlet on an upper surface of the second casing, and a lens aperture on a side surface of the second casing, wherein the first tissue outlet corresponds in position to the second tissue outlet; a supporter positioned above the battery chamber and configured to support a tissue pack; and a camera unit comprising a lens unit and a printed circuit board, the lens unit comprising a lens, and the printed circuit board being provided with at least an electronic device, wherein the lens is positioned immediately behind the lens aperture.

BRIEF DESCRIPTION OF THE DRAWINGS

To enable persons skilled in the art to gain insight into the structures, features, and effects of the use of the present invention, the present invention is hereunder illustrated with preferred embodiments in conjunction with the accompanying drawings, wherein.

DETAILED DESCRIPTION OF THE INVENTION

Figure 1:
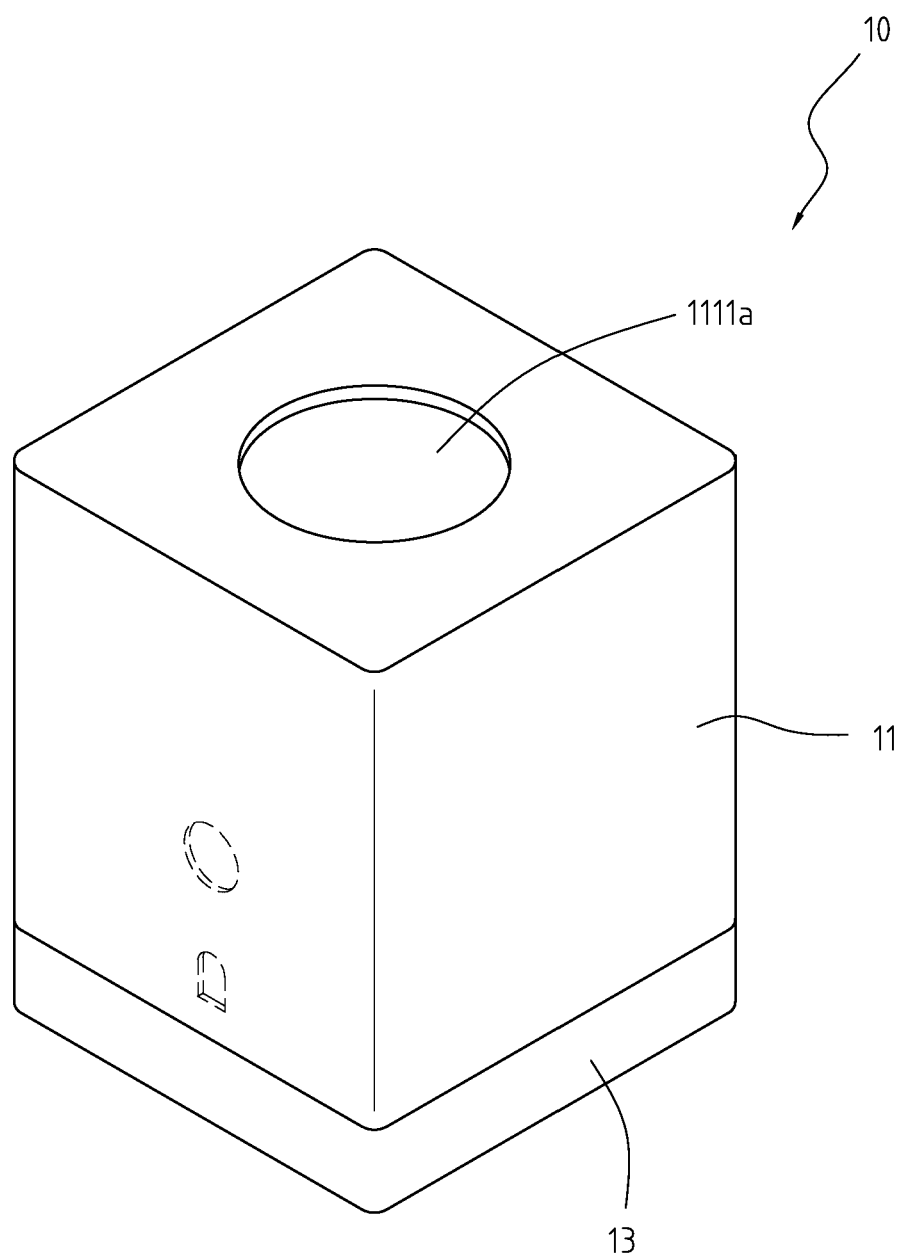
FIG. 1 is a perspective view of a hidden camera disguised as a tissue box according to the present invention.
Figure 2:
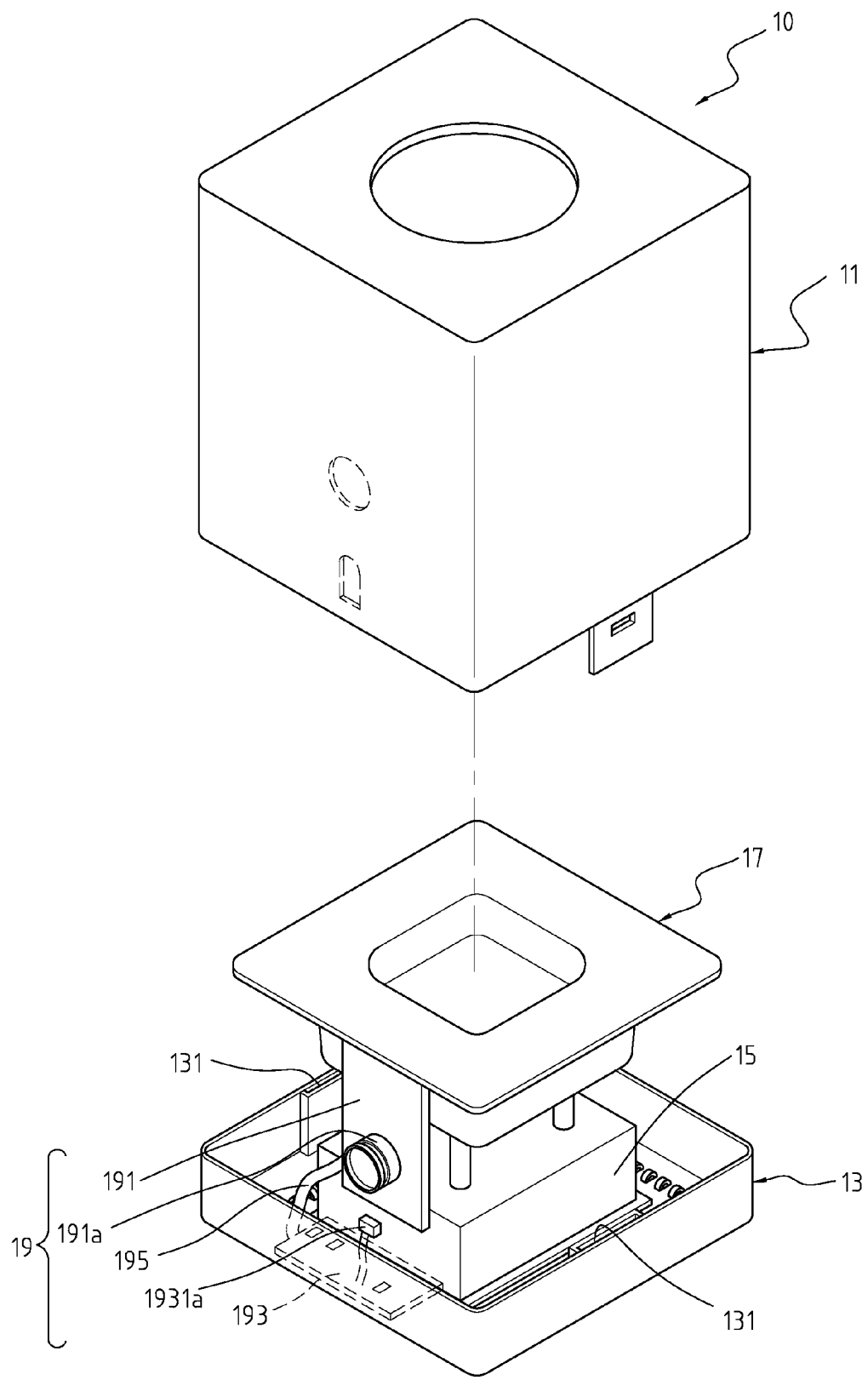
FIG. 2 is a perspective view of the hidden camera disguised as a tissue box, as viewed when a casing and a base of the hidden camera are separated from each other, according to the present invention.
Figure 3:
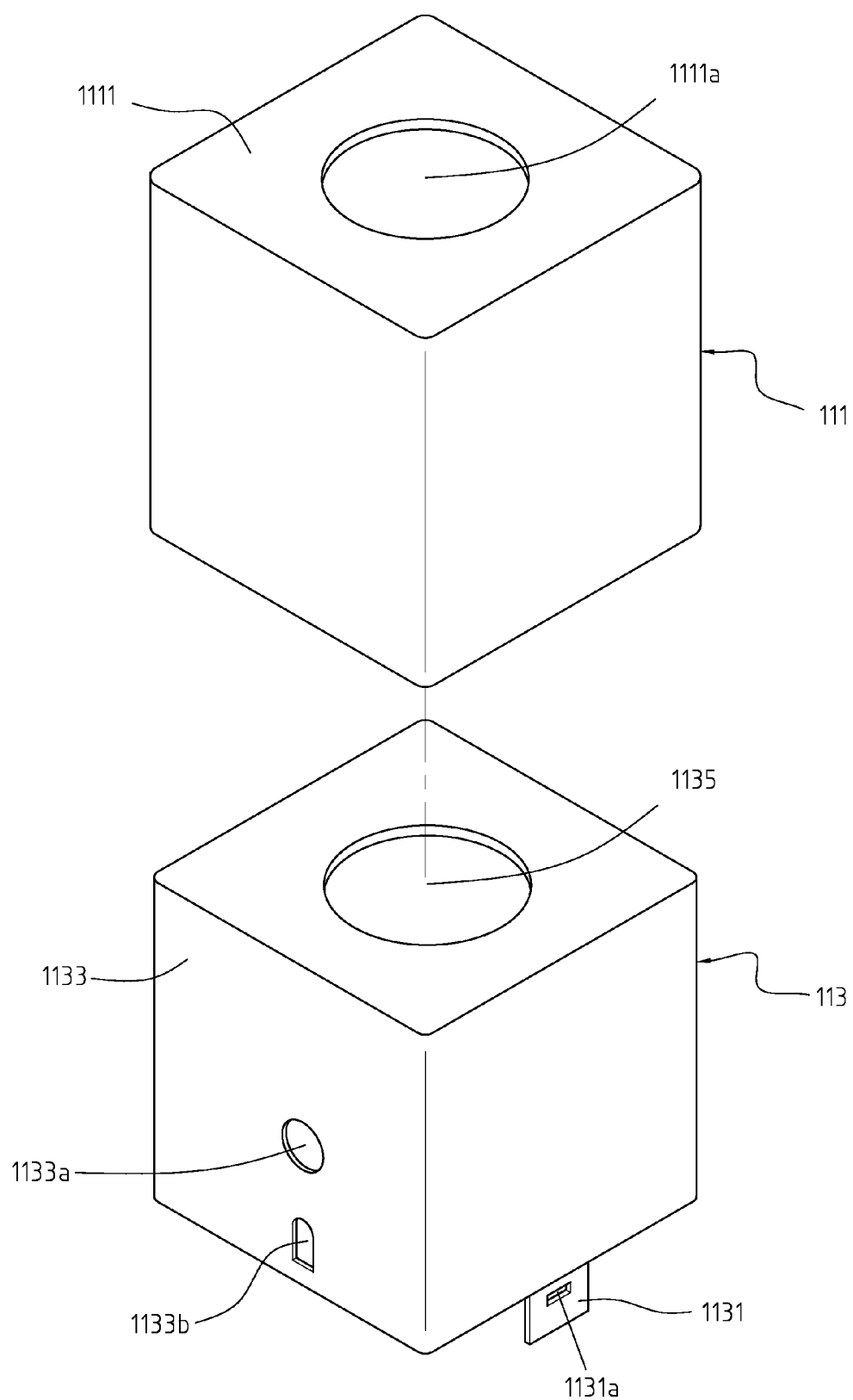
FIG. 3 is an exploded view of the casing of the hidden camera disguised as a tissue box according to the present invention.

Referring to FIGS. 1, 2 and 3, which are drawings of a hidden camera 10 disguised as a tissue box so as for the hidden camera 10 to have the semblance of a tissue box according to the present invention. The hidden camera 10 comprises a casing 11 and a base 13, allowing the casing 11 to be engaged with and fixed in position to the base 13 as shown in FIG. 1. The casing 11 is separable from the base 13 as shown in FIG. 2. A tissue pack (not shown) is placed on a supporter 17. The topmost piece of tissue paper removable from the tissue pack sticks out of the first and the second tissue outlets 1111a, 1135.

The hidden camera 10 essentially comprises the casing 11, the base 13, a battery chamber, a supporter 17, and a camera unit 19. The battery chamber 15, the supporter 17, the camera unit 19, and the tissue pack are hidden within the inner space of the casing 11 after the casing 11 has been engaged with and fixed in position to the base 13. Details are as follows.

Referring to FIG. 3, the casing 11 comprises the first casing 111 and the second casing 113. The first and the second casings 111, 113 are box-shaped. The first casing 111 encloses and fits the second casing 113. The first tissue outlet 1111a is provided on the upper surface 1111 of the first casing 111. A lens aperture 1133a is formed on a side surface 1133 of the second casing 113. Engaging columns 1131 are provided on two other side surfaces of the second casing 113 and extend downward therefrom, respectively, wherein the two engaging column-disposed side surfaces of the second casing 113 are opposite. The second tissue outlet 1135 is provided on the upper surface of the second casing 113. The second tissue outlet 1135 of the second casing 113 corresponds in position to the first tissue outlet 1111a of the first casing 111. The casing 11 is engaged with and fixed in position to the base 13 by steps of: inserting the engaging columns 1131 of the second casing 113 into engaging slots 131 of the base 13, respectively; inserting bumps (not shown) provided in the engaging slots 131 into engaging holes 1131a of the engaging columns 1131, respectively; and enclosing the second casing 113 with the first casing 111 to assemble the casing 11.

The first casing 111 is made of a translucent material, such as a translucent acrylic material. The second casing 113 is made of an opaque material, such as an opaque acrylic material. The first casing 111 and the second casing 113 are of deep color, such as black. As described above, the casing 11 comprises two casings, with one enclosing and fitting another; hence, the battery chamber 15, the supporter 17, and the camera unit 19 covertly installed within the inner space of the fake tissue box are unlikely to be discovered from the outside.

Figure 4:
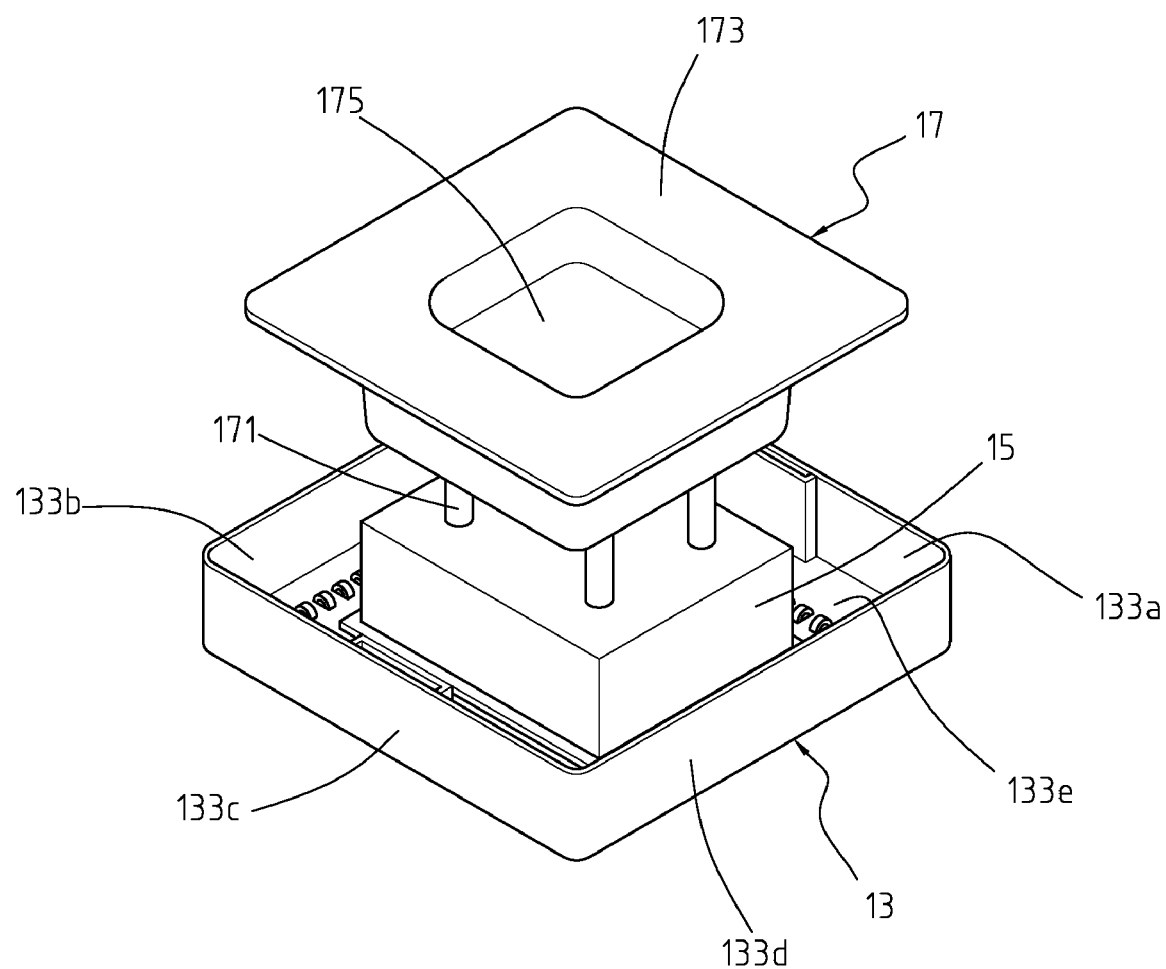
FIG. 4 is a perspective view showing the base, a battery chamber, and a supporter of the hidden camera disguised as a tissue box according to the present invention.

Referring to FIG. 4, the base 13 and the battery chamber 15 together form a one-piece unit. The base 13 and the battery chamber 15 are made of plastics, for example. In a specific embodiment, the base 13 comprises four side walls 133a~3d defining an enclosed space and a bottom wall 133e enclosed by four said side walls 133a~133d. The bottom wall 133e has a hollowed-out region 1333 (as shown in FIG. 5) corresponding in position to the battery chamber 15.

The battery chamber 15 is centrally positioned in the enclosed space inside the base 13. In a specific embodiment, the battery chamber 15 is a box structure with an open side facing the hollowed-out region 1333 of bottom wall 133e.

Figure 5:
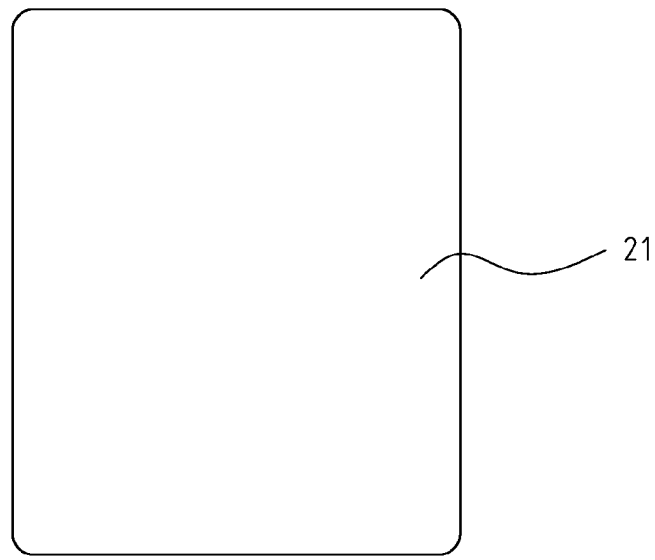
FIG. 5 is a front elevational view showing a bottom wall and a battery cover of the base according to the present invention.
Figure 5:
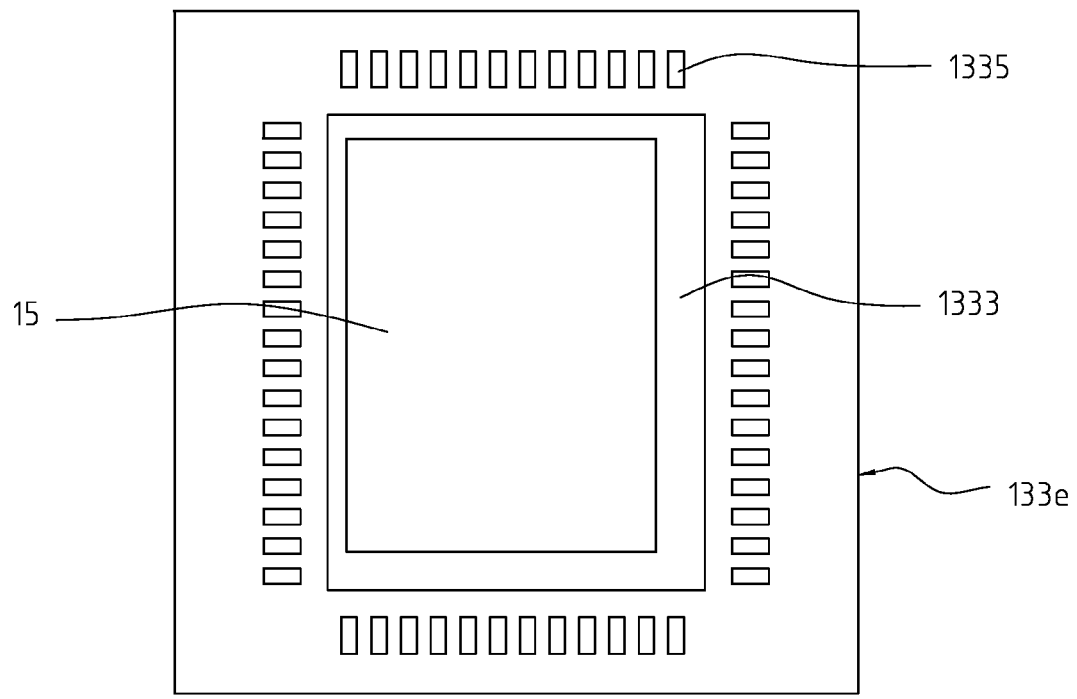

Referring to FIG. 5, a battery (not shown) is placed in the battery chamber 15 from the bottom of the base 13. To replace batteries, it is necessary to separate a battery cover 21 from the bottom wall 133e, take old batteries out, place new batteries in the battery chamber 15, and cover the hollowed-out region 1333 with the battery cover 21. The battery cover 21 is configured to be engaged with and fixed in position to the bottom wall 133e. Furthermore, the battery cover 21 is engaged with and fixed in position to the bottom wall 133e by a conventional means.

The bottom wall 133e is further provided with a plurality of heat-dissipating slits 1335. Heat generated by the camera unit 19 is dissipated via the heat-dissipating slits 1335.

The supporter 17 is positioned above the battery chamber 15 and configured to support the tissue pack. In a specific embodiment, the supporter 17 is a tank structure having a bottom provided with at least three posts 171. The upper edge of a tank 175 of the supporter 17 is defined by the supporting plate 173. The supporting plate 173 is substantively square-shaped. One end of each of the posts 171 is fixed in position to an upper side wall of the battery chamber 15, thus allowing the supporter 17 to stand on the battery chamber 15.

In another specific embodiment, the supporter 17 is a table-like structure with a tabletop for supporting the tissue pack.

Figure 6:
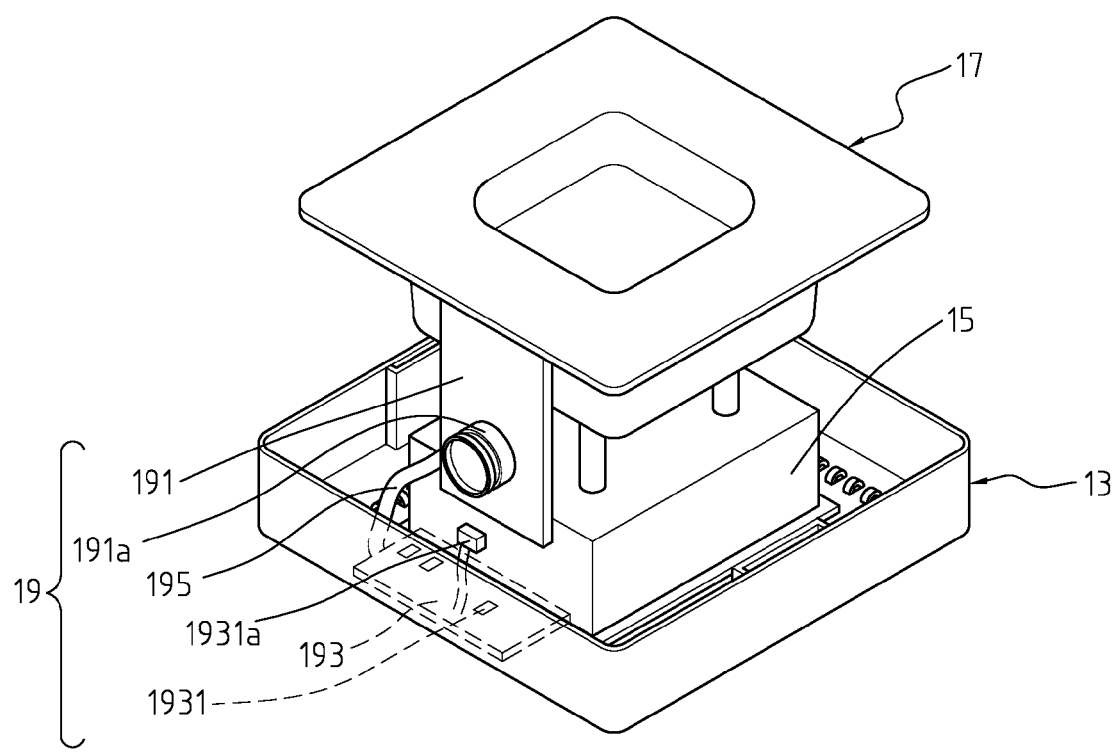
FIG. 6 is a perspective view showing a camera unit, the base, the battery chamber, and the supporter of the hidden camera disguised as a tissue box according to the present invention.

Referring to FIG. 6, the camera unit 19 comprises a lens unit 191 and a printed circuit board 193. The printed circuit board 193 is provided with at least an electronic device 1931. The lens unit 191 comprises a lens 191a positioned immediately behind the lens aperture 1133a. The lens unit 191 is, for example, fixed in position to a side of the supporter 17, wherein the side of the supporter 17 faces the lens aperture 1133a. The printed circuit board 193 is, for example, fixed in position to the base 13 or an outer surface of the battery chamber 15. Alternatively, the printed circuit board 193 is disposed between the battery chamber 15 and the posts 171. The lens unit 191 is electrically connected to the at least an electronic device 1931 provided for the printed circuit board 193 via a cable 195.

The at least an electronic device 1931 comprises a signal receiver 1931a positioned immediately behind a signal hole 1133b of the second casing 113 and electrically connected to the at least an electronic device 1931 provided for the printed circuit board 193. In a specific embodiment, the signal receiver 1931a is an infrared diode. The purpose of the signal hole 1133b of the second casing 113 is to enable a signal generated by a signal transmitter (not shown) with the signal receiver 1931a to be better received by the signal receiver 1931a.

The camera unit 19 can be implemented according to the prior art and thus can be a conventional pinhole camera.

The hidden camera 10 disguised as a tissue box according to the present invention is characterized in that the casing 11 comprises two casings, with one enclosing and fitting another; hence, the battery chamber 15, the supporter 17, and the camera unit 19 covertly installed within the inner space of the fake tissue box are unlikely to be discovered from the outside, which is the characteristics of the present invention.

In addition, the hidden camera 10 disguised as a tissue box according to the present invention is better disguised as a tissue box than a conventional pinhole camera, because the conventional pinhole camera is not equipped with the lens aperture-free first casing 111 of the present invention.

The above description serves to expound preferred embodiments of the present invention rather than limit the scope of implementation of the present invention. Persons skilled in the art should be able to make obvious changes or modification of the present invention without departing from the substantive disclosure of the present invention.

What is claimed is:

1. A hidden camera disguised as a tissue box, comprising:
    a base;
    a battery chamber;
    a casing comprising a first casing and a second casing, the first and second casings being box-shaped and engaged with and fixed in position to the base, with the first casing enclosing and fitting the second casing, allowing a first tissue outlet to be provided on an upper surface of the first casing, a second tissue outlet on an upper surface of the second casing, and a lens aperture on a side surface of the second casing, wherein the first tissue outlet corresponds in position to the second tissue outlet;
    a supporter is configured to support a tissue pack; and
    a camera unit comprising a lens unit and a printed circuit board, the lens unit comprising a lens, and the printed circuit board being provided with at least an electronic device, wherein the lens is positioned immediately behind the lens aperture.

2. The hidden camera of claim 1, wherein the supporter is a tank structure having a bottom provided with at least three posts.

3. The hidden camera of claim 1, wherein the first casing is made of a translucent material, and the second casing is made of an opaque material.

4. The hidden camera of claim 1, wherein the first casing is made of a translucent acrylic material, and the second casing is made of an opaque acrylic material.

5. The hidden camera of claim 1, wherein the side surface of the second casing is further provided with a signal hole.

6. The hidden camera of claim 5, wherein the at least an electronic device comprises a signal receiver positioned immediately behind the signal hole.

7. The hidden camera of claim 1, wherein the base comprises four side walls defining an enclosed space and a bottom wall enclosed by four said side walls.

8. The hidden camera of claim 7, wherein the bottom wall has a hollowed-out region corresponding in position to the battery chamber.

9. The hidden camera of claim 8, further comprising a battery cover engaged with and fixed in position to the bottom wall and configured to cover the hollowed-out region of the bottom wall.

10. The hidden camera of claim 7, wherein the side walls, the bottom wall, and the battery chamber together form a one-piece unit.

11. The hidden camera of claim 7, wherein the bottom wall is further provided with a plurality of heat-dissipating slits.

12. The hidden camera of claim 1, wherein the battery chamber is provided between the base and the supporter.

13. The hidden camera of claim 1, wherein the supporter is positioned above the battery chamber.

* * * * *